(12) United States Patent
Ball et al.

(10) Patent No.: US 7,176,157 B2
(45) Date of Patent: Feb. 13, 2007

(54) ANODE STRUCTURE

(75) Inventors: Sarah Ball, Reading (GB); David Thompsett, Reading (GB)

(73) Assignee: Johnson Matthey Public Limited Company, London (GB)

( * ) Notice: Subject to any disclaimer, the term of this patent is extended or adjusted under 35 U.S.C. 154(b) by 261 days.

(21) Appl. No.: 10/380,805

(22) PCT Filed: Sep. 7, 2001

(86) PCT No.: PCT/GB01/04009

§ 371 (c)(1),
(2), (4) Date: Mar. 18, 2003

(87) PCT Pub. No.: WO02/25759

PCT Pub. Date: Mar. 28, 2002

(65) Prior Publication Data

US 2004/0045819 A1    Mar. 11, 2004

(30) Foreign Application Priority Data

Sep. 19, 2000   (GB)  ................. 0022895.7

(51) Int. Cl.
*H01M 4/88* (2006.01)
*H01M 4/00* (2006.01)
*B01J 21/18* (2006.01)
*B01J 23/40* (2006.01)

(52) U.S. Cl. ............... 502/101; 502/185; 429/40; 429/41; 429/42; 429/43; 429/44

(58) Field of Classification Search ............ 502/101, 502/182, 185; 429/40–44
See application file for complete search history.

(56) References Cited

U.S. PATENT DOCUMENTS

| | | | |
|---|---|---|---|
| 4,501,803 A * | 2/1985 | Bannochie | ............... 429/101 |
| 4,876,115 A | 10/1989 | Raistrick | |
| 5,069,988 A * | 12/1991 | Tomantschger et al. | ...... 429/59 |
| 5,395,705 A * | 3/1995 | Door et al. | ............... 429/42 |
| 5,482,680 A | 1/1996 | Wilkinson et al. | |
| 5,523,177 A * | 6/1996 | Kosek et al. | ............... 429/40 |
| 5,600,028 A * | 2/1997 | Gubitosa et al. | ............ 568/861 |

(Continued)

FOREIGN PATENT DOCUMENTS

DE    3912735    10/1990

(Continued)

OTHER PUBLICATIONS

International Search Report of Application No. PCT/GB01/04009, no month/year.

(Continued)

*Primary Examiner*—J. A. Lorengo
*Assistant Examiner*—Patricia L. Hailey
(74) *Attorney, Agent, or Firm*—RatnerPrestia

(57) ABSTRACT

An anode structure comprising a ruthenium catalyst is disclosed. The catalyst consists essentially of ruthenium deposited on a conducting support wherein the ruthenium is in metallic form or in a form that is readily reducible to the metallic form at temperatures of 25° C. to 150° C. The anode structure is particularly of use in proton exchange membrane fuel cell to prevent poisoning of the electrocatalyst by impurities in the fuel stream to the anode.

17 Claims, 2 Drawing Sheets

U.S. PATENT DOCUMENTS

Figure 1:
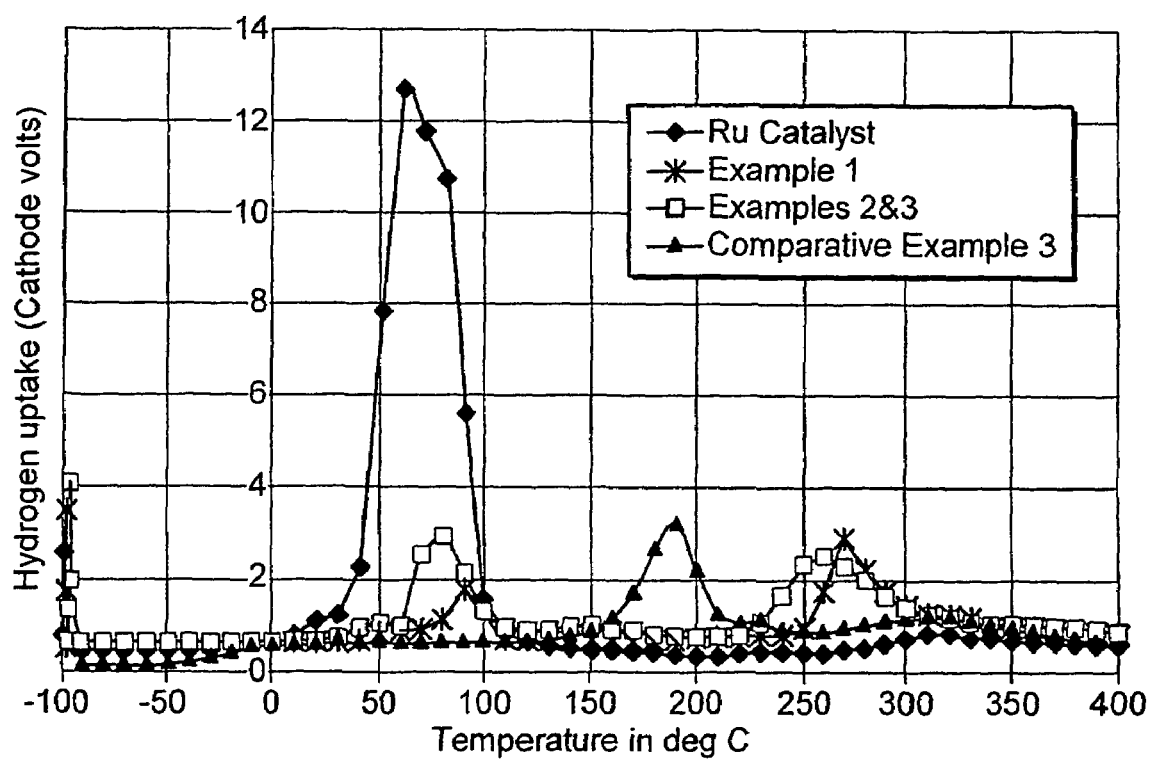

| | | | |
|---|---|---|---|
| 5,773,162 A | | 6/1998 | Surampudi et al. |
| 5,795,669 A | * | 8/1998 | Wilkinson et al. ............ 429/40 |
| 5,935,643 A | * | 8/1999 | Song et al. ................. 427/115 |
| 5,958,616 A | * | 9/1999 | Salinas et al. ................ 429/41 |
| 6,007,934 A | * | 12/1999 | Auer et al. ................... 429/44 |
| 6,054,232 A | * | 4/2000 | Ippommatsu et al. ......... 429/40 |
| 6,326,098 B1 | * | 12/2001 | Itoh et al. ..................... 429/40 |
| 6,465,136 B1 | * | 10/2002 | Fenton et al. .............. 429/309 |
| 6,531,240 B1 | * | 3/2003 | Brown et al. ................. 429/44 |
| 6,855,452 B1 | * | 2/2005 | Cooper et al. ................ 429/41 |
| 2004/0043283 A1 | * | 3/2004 | Cipollini et al. ............. 429/40 |

FOREIGN PATENT DOCUMENTS

| | | |
|---|---|---|
| EP | 0 441 329 A2 | 8/1991 |
| EP | 0736921 | 10/1996 |
| EP | 0952241 | 10/1999 |
| EP | 0450849 | 1/2000 |
| GB | 2 227966 | 8/1990 |
| GB | 2 307651 | 6/1997 |

OTHER PUBLICATIONS

Search Report of Application No. GB 0022895.7, no month/year.

R. Lemons, Journal of Power Sources, vol. 29, 1990, pp. 251-264, no month.

L. Niedrach et al., Electrochemical Technology, vol. 5, 1967, pp. 318-323, no month.

Gottesfeld and Pafford J. Electrochem. Soc, vol. 135, 1988, pp. 2651-2652, no month.

* cited by examiner

ANODE STRUCTURE

This invention relates to a novel anode structure, particularly suitable for use in proton exchange membrane fuel cells, which may be used for the removal of impurities from an impure gas stream, particularly for the removal of carbon monoxide from a reformate fuel stream.

Electrochemical cells invariably comprise at their fundamental level a solid or liquid electrolyte and two electrodes, the anode and cathode, at which the desired electrochemical reactions take place. A fuel cell is an energy conversion device that efficiently converts the stored energy of its fuel into electrical energy by combining hydrogen, stored as a gas, or methanol, stored as a liquid or gas, with oxygen to generate electrical power. The hydrogen or methanol is oxidised at the anode and oxygen reduced at the cathode. In these cells gaseous reactants and/or products have to be diffused into and/or out of the cell electrode structures. The electrodes therefore are specifically designed to be porous to gas diffusion in order to optimise the contact between the reactants and the reaction sites in the electrode to maximise the reaction rate. An electrolyte is required which is in contact with both electrodes and which may be alkaline or acidic, liquid or solid. In a solid polymer fuel cell (SPFC), also known as a proton-exchange membrane fuel cell (PEMFC), the electrolyte is a solid proton-conducting polymer membrane, commonly based on perfluorosulphonic acid materials. These electrolytes must be maintained in a hydrated form during operation in order to prevent loss of ionic conduction through the electrolyte; this limits the operating temperature of the PEMC to between 70° C. and 120° C., depending on the operating pressure. The PEMFC does, however, provide much higher power density output than the other fuel cell types, and can operate efficiently at much lower temperatures. Because of this, it is envisaged that the PEMFC will find use in vehicular power generation and small-scale residential power generation applications. In particular, vehicle zero-emission regulations have been passed in areas of the United States that are likely to restrict the use of the combustion engine in the future. Pre-commercial PEMFC-powered buses and prototype PEMFC-powered vehicles are now being demonstrated for these applications.

Due to the relatively low operating temperatures of these systems, the oxidation and reduction reactions require the use of catalysts in order to proceed at useful rates. Catalysts, which promote the rates of electrochemical reactions, such as oxygen reduction and hydrogen oxidation in a fuel cell, are often referred to as electrocatalysts. Precious metals, in particular platinum, have been found to be the most efficient and stable electrocatalysts for all low-temperature fuel cells operating below 300° C. The platinum electrocatalyst is provided as very small particles (~20–50 Å) of high surface area, which are often, but not always, distributed on and supported by larger macroscopic conducting carbon particles to provide a desired catalyst loading. Conducting carbons are the preferred materials to support the catalyst.

In the PEMFC the combined laminate structure formed from the membrane and the two electrodes is known as a membrane electrode assembly (MEA). The MEA will typically comprise several layers, but can in general be considered, at its basic level, to have five layers, which are defined principally by their function. On either side of the membrane an anode and cathode electrocatalyst is incorporated to increase the rates of the desired electrode reactions. In contact with the electrocatalyst containing layers, on the opposite face to that in contact with the membrane, are the anode and cathode gas diffusion substrate layers. The anode gas diffusion substrate is designed to be porous and to allow the reactant hydrogen or methanol to enter from the face of the substrate exposed to the reactant fuel supply, and then to diffuse through the thickness of the substrate to the layer which contains the electrocatalyst, usually platinum metal based, to maximise the electrochemical oxidation of hydrogen or methanol. The anode electrocatalyst layer is also designed to comprise some level of the proton conducting electrolyte in contact with the same electrocatalyst reaction sites. With acidic electrolyte types the product of the anode reaction are protons and these can then be efficiently transported from the anode reaction sites through the electrolyte to the cathode layers. The cathode gas diffusion substrate is also designed to be porous and to allow oxygen or air to enter the substrate and diffuse through to the electrocatalyst layer reaction sites. The cathode electrocatalyst combines the protons with oxygen to produce water. Product water then has to diffuse out of the cathode structure. The structure of the cathode has to be designed such that it enables the efficient removal of the product water. If water builds up in the cathode, it becomes more difficult for the reactant oxygen to diffuse to the reaction sites, and thus the performance of the fuel cell decreases.

The complete MEA can be constructed by several methods. The electrocatalyst layers can be bonded to one surface of the gas diffusion substrates to form what is known as a gas diffusion electrode. The MEA is then formed by combining two gas diffusion electrodes with the solid proton-conducting membrane. Alternatively, the MEA may be formed from two porous gas diffusion substrates and a solid proton-conducting polymer membrane catalysed on both sides; or indeed the MEA may be formed from one gas diffusion electrode and one gas diffusion substrate and a solid proton-conducting polymer membrane catalysed on the side facing the gas diffusion substrate.

Gas diffusion substrates or electrodes are employed in many different electrochemical devices in addition to fuel cells, including metal-air batteries, electrochemical gas sensors, and electrochemical reactors for the electrosynthesis of useful chemical compounds.

In most practical fuel cell systems, the hydrogen fuel is produced by converting a hydrocarbon-based fuel (such as methane) or an oxygenated hydrocarbon fuel (such as methanol) to hydrogen in a process known as reforming. This fuel, referred to as reformate, contains (in addition to hydrogen) small amounts of impurities such as carbon monoxide (CO), typically at levels of around 1%. For fuel cells operating at temperatures below 200° C., and especially for the PEMFC operating at temperatures around 100° C., it is well known that CO, even at levels of 1–10 ppm, is a severe poison for the platinum electrocatalysts present in the electrodes. This leads to a significant reduction in fuel cell performance, i.e. the cell voltage at a given current density is reduced. This deleterious effect is more pronounced in PEMFCs operating at lower temperatures.

Various methods have been employed to alleviate anode CO poisoning. For example, reformer technology has been redesigned to include an additional catalytic reactor, known as a preferential or selective oxidation reactor. This involves the injection of air or oxygen into the hydrogen-containing reactant gas stream, prior to it passing over a selective oxidation catalyst, to oxidise the CO to $CO_2$. This can reduce the levels of CO from 1–2% down to below 100 ppm. However, even at these levels, the anode electrocatalyst in the PEMFC is still poisoned.

It has also been found that poisoning of the electrocatalyst by CO at levels of 1–100 ppm can be reduced by the use of an oxygen or air bleed directly into the anode gas stream just before it enters the anode chamber of the fuel cell itself. This is described by Gottesfeld and Pafford in J. Electrochem. Soc., 135, 2651 et seq. (1988). This technique is believed to have the effect of oxidising the residual CO in the fuel to $CO_2$, the reaction being catalysed by electrocatalyst sites present in the anode:

$$CO + \tfrac{1}{2} O_2 \rightarrow CO_2$$

This technique provides fuel cell performance that is much closer to the performance observed when no CO is present in the fuel stream.

A further technique for alleviating fuel cell performance reduction due to anode CO poisoning is to employ an anode electrocatalyst which is itself intrinsically more poison tolerant, but which still functions as a hydrogen oxidation catalyst in the presence of CO. With this approach it is not necessary to employ the air bleed technique described above to obtain improved performance. As described by, for example, L Niedrach et al in Electrochemical Technology, Vol. 5, 1967, p 318, the use of a bimetallic anode electrocatalyst comprising platinum/ruthenium, rather than the more conventionally used mono-metallic platinum only electrocatalyst, shows a reduction in the poisoning effect of the CO at typical PEMFC operating temperatures. The bimetallic catalyst does not, however, reduce the levels of CO in the reactant fuel stream, but is slightly more tolerant towards the presence of CO than platinum electrocatalyst alone. However, again it has not yet been possible to fully attain the performance observed on pure hydrogen, i.e. in the absence of CO in the fuel stream, by using this approach in isolation.

It thus appears that there exist two commonly used techniques for improving the performance of fuel cell anodes for operation on reformate fuel comprising trace levels of CO, i.e. the use of an air bleed and the use of a more poison tolerant electrocatalyst. However, the improvement the techniques offer are explained by the operation of two different reaction mechanisms. Firstly, with the air bleed technique, it is postulated that in the presence of oxygen the anode electrocatalyst facilitates the oxidation of CO to $CO_2$, as described in the reaction above. The low level of $CO_2$ produced from the CO does not have a major poisoning effect. Secondly, even in the absence of air bleed, the poisoning effect of CO can be reduced by using a modified anode electrocatalyst (i.e. one that is more tolerant towards the poison). The mechanism proposed for this improvement is that the active sites on the modified electrocatalyst are less prone to poisoning by adsorption of the poisoning species and more sites are left available to perform the desired hydrogen oxidation reaction.

Currently low temperature fuel cells, such as the PEMFC, typically employ electrodes comprising a single catalyst component to accelerate the hydrogen oxidation and oxygen reduction reactions. The prior art provides many examples of this. For example, R Lemons in Journal of Power Sources, Vol. 9, 1990, p 251, shows that similar single component platinum catalysts are used for both anode and cathode reactions in PEMFC technology.

In the case of the PEMFC, operating on reformate fuel containing CO in addition to hydrogen, this type of electrode does not provide sufficient activity or durability for practical applications. From a cost point of view it is desirable to use electrodes with loadings of the precious metal electrocatalyst of lower than 1.0 mg/cm² of electrode area. At these loadings, it has not yet been possible to produce an anode electrocatalyst with high enough intrinsic tolerance to poisoning, such that, when no air bleed is employed, the performance is close to that observed with hydrogen fuel with no poisoning species present.

The air bleed technique has most frequently been employed in PEMFCs in which the anode also comprises a conventional single phase electrocatalyst material. This is typically a bimetallic platinum/ruthenium catalyst. Although it is possible to improve the performance of the PEMFC to close to the level that would be observed if no poisoning species were present, there are concerns over the long term sustainability of the performance when this conventional type of electrode is employed. This is particularly the case if high levels of air bleed, equivalent to 4% and above of the total reformate fuel volume, are required.

A recent approach to minimise the effect of CO poisoning by use of an air bleed is disclosed in U.S. Pat. No. 5,482,680. This patent discloses the use of a selective oxidation catalyst, present as a gas-porous bed or layer, placed between the fuel stream inlet of the fuel cell and the anode catalyst layer. In particular, the catalyst bed or layer can be placed in a variety of positions within the fuel stream manifold, including within the fuel stream inlet and fuel stream humidification apparatus.

EP 0 736 921 discloses an electrode with a first and a second catalytic component, the first catalytic component being designed to be a gas phase catalyst capable of removing the impurities of an impure gas stream. The preferred gas phase catalyst is disclosed as being platinum supported on carbon. Although the platinum on carbon described in the above mentioned application shows an improvement in the concentration of impurities in the reformate stream, it would still be advantageous to reduce the impurity concentration even further or to obtain the same efficiency in the reduction of impurities in the reformate stream using a lower level of air bleed. In addition, platinum is an expensive metal and it would be advantageous to obtain the same reduction in impurity concentration but at a lower cost.

To this end the present inventors have discovered that the metallic state of ruthenium is a more effective gas phase catalyst and will efficiently remove impurities, in particular carbon monoxide from an impure stream. However, ruthenium readily oxidises in air to give $RuO_2$, which in itself is not an appropriate catalyst. The inventors have thus found that removal of impurities can efficiently be carried out by using metallic ruthenium or ruthenium in a form that is able to be readily reduced to the metallic state of ruthenium under fuel cell operating conditions, for example ruthenium oxide. Accordingly, a first aspect of the invention provides an anode structure comprising a ruthenium catalyst, characterised in that said catalyst consists essentially of ruthenium deposited on a conducting support wherein the ruthenium is at least partially present in metallic form or in a form that is readily reducible to the metallic form at temperatures of 25° C. to 150° C.

A readily available technique which may be used to determine whether the ruthenium is in a state capable of being readily reduced to the metallic form at temperatures of from 25° C. to 150° C. is known at Temperature Programmed Reduction (TPR). The TPR technique involves cooling the sample in an inert atmosphere (usually nitrogen) to a temperature below room temperature (usually –100° C.). The gas mixture is changed to ~10% hydrogen in nitrogen and after stabilisation the sample temperature is slowly increased and the output/exhaust gas is analysed. A detector measures the levels of hydrogen in the output/exhaust gas;

depletion of hydrogen in the output gas corresponds to uptake of hydrogen by the sample, which equates to reduction of the ruthenium compound to metallic ruthenium. By analysing the output gas as the temperature is increased, a TPR profile for the sample is obtained, and the temperature over which the species is active is determined.

The anode structure according to the present invention is suitably for use in proton exchange membrane fuel cells which may operate at temperatures of 25° C. up to 150° C., but suitably operate at temperatures of from 50° C. to 100° C.

As mentioned above, the ruthenium used in the anode structure of the invention is required to be at least partially present either in the metallic state or in a state which is capable of being reduced to the metallic state at the given temperatures. It has been found that amorphous or poorly crystalline states or a combination of the two are particularly preferred. Determination of the particular state of the ruthenium can readily be determined by known techniques, such as X-ray Diffraction and Transmission Electron Microscopy.

The ruthenium is deposited on a conducting support, suitably a carbon support such as Cabot Vulcan XC72R.

The term anode structure in the context of the present invention means any of the functional components and structures associated with the anode side of the MEA through which hydrogen or methanol fuel is either transported or reacted, i.e. within the gas diffusion substrate and electrocatalyst containing layers on the anode side of the membrane. The anode structure of the invention is suitably used in a PEM fuel cell when an impure fuel is fed to the anode. The anode structure may be used with or without the presence of an air bleed. Suitably, the anode structure is used in a PEM fuel cell to prevent poisoning of the electrocatalyst metal on the anode side of the MEA; therefore the ruthenium catalyst is suitably positioned in the anode structure at any point before the impure gas stream reaches the electrocatalyst metal in the MEA. Thus, specific embodiments of the invention include:

(i) a gas diffusion substrate comprising a ruthenium catalyst, characterised in that said catalyst consists essentially of ruthenium deposited on a conducting support wherein the ruthenium is in metallic form or in a form that is readily reducible to the metallic form at temperatures of 25° C. to 150° C. The ruthenium catalyst may be applied to either face of the gas diffusion substrate (i.e. either facing the gas stream or away from the gas stream, when in use as part of a PEM fuel cell) or embedded within the gas diffusion substrate or a combination thereof.

(ii) a gas diffusion electrode comprising a gas diffusion substrate coated with a layer of an electrocatalyst and further comprising a ruthenium catalyst, characterised in that said catalyst consists essentially of ruthenium deposited on a conducting support wherein the ruthenium is in metallic form or in a form that is readily reducible to the metallic form at temperatures of 25° C. to 150° C. Again the ruthenium catalyst may be applied to either face of the gas diffusion substrate or embedded within the gas diffusion substrate or a combination thereof. If the ruthenium catalyst is applied to the face of the gas diffusion substrate also having applied thereto the layer of electrocatalyst, then suitably the ruthenium catalyst is first applied to the substrate and subsequently the electrocatalyst is applied to the ruthenium catalyst layer.

(iii) an electrocatalyst coated membrane comprising a ruthenium catalyst, characterised in that said catalyst consists essentially of ruthenium deposited on a conducting support wherein the ruthenium is in metallic form or in a form that is readily reducible to the metallic form at temperatures of 25° C. to 150° C. Suitably, the ruthenium catalyst is applied to the electrocatalyst layer which has previously been applied to a membrane.

The ruthenium catalyst may be applied to the gas diffusion substrate or membrane by any technique well known in the art. For example, the ruthenium catalyst may first be formulated into an ink composition by combining the ruthenium catalyst with a polymer, preferably a hydrophobic polymer such as PTFE or FEP, and then applying the ink composition to the substrate or membrane by known techniques, such as screen printing, filter transfer or other means. The substrate or membrane must be formulated in such as way as to preserve the ruthenium catalyst in a suitable form to be reduced to ruthenium metal in the presence of hydrogen at temperatures of 25° C. to 150° C. For example, it is preferable that the presence of hydrogen at temperatures of 25° C. to 150° C. For example, it is preferable that the resulting substrate or membrane is not subjected to temperatures greater than approximately 375° C., preferably 275° C. In the situation where the anode structure is an electrocatalyst coated membrane, it is preferable that the structure is not subjected to temperatures greater than the decomposition temperature of the membrane. It is also preferred that any firing or heat treatment of the substrate or membrane is carried out in an environment devoid of oxygen, for example it is preferable that any firing or heat treatment of the substrate or membrane is carried out in nitrogen.

The electrocatalyst may be applied to the gas diffusion substrate or membrane by any technique well known in the art. Suitable electrocatalysts include platinum/ruthenium alloy catalysts. The electrocatalyst ink suitably comprises a proton-conducting ionomer such as Nafion®.

In a further aspect the invention provides a membrane electrode assembly comprising an anode structure according to the invention.

In a yet further aspect the invention provides a fuel cell comprising a membrane electrode assembly according to the invention.

The invention will now be illustrated by Examples which are illustrative and not limiting of the invention.

Composition Preparation

The platinum catalyst used for Comparative Examples 1 and 2 (20% Pt supported on XC72R carbon) was prepared as described in EP 0 736 921. The platinum catalyst was then formulated into an ink using PTFE.

The ruthenium catalyst for use in Comparative Example 3 and the three examples of the invention was prepared by deposition of ruthenium onto the conductive carbon black substrate to give a catalyst with 20% ruthenium supported on XC-72R carbon. The catalyst was prepared via hydrolysis of an aqueous solution of ruthenium trichloride by a solution of sodium hydrogen carbonate in the presence of the carbon black, as disclosed in EP 0 450 849. The catalyst was filtered, washed free of soluble chloride salts and dried in a vacuum oven at 80° C. The ruthenium catalyst was then formulated into an ink using either PTFE or FEP.

Electrode Preparation

Electrodes were prepared by application of the ink comprising the platinum catalyst (for Comparative Examples 1 and 2) or the ink comprising the ruthenium catalyst (for Comparative Example 3 and Examples 1 to 3) to pre-teflonated Toray TGP090 paper and firing, either in air or in nitrogen as described in EP 0 736 921. Table 1 gives details of the Comparative Examples and Examples, the metal/metal loading, the polymer used and the firing conditions.

TABLE 1

| Example | Metal/metal loading (mg/cm$^2$) | Polymer | Firing Conditions |
|---|---|---|---|
| Comparative Example 1 | Pt/0.2 | PTFE 18% | 375° Air |
| Comparative Example 2 | Pt/0.3 | PTFE 18% | 375° Air |
| Comparative Example 3 | Ru/0.3 | PTFE 18% | 375° Air |
| Example 1 | Ru/0.3 | PTFE 18% | 375° Nitrogen |
| Example 2 | Ru/0.3 | FEP 12% | 275° Nitrogen |
| Example 3 | Ru/0.2 | FEP 12% | 275° Nitrogen |

Sample Evaluation

The ruthenium catalyst and examples of the invention underwent the following tests: TPR profile measurements, XRD and/or TEM studies and an ex-situ test of catalyst activity to fully define the properties of the active catalyst layer.

TPR Measurements

The ruthenium catalyst, Comparative Example 3 and Examples 1, 2 and 3 were subjected to TPR measurement to determine the catalytic activity profile at temperatures from −100° C. up to 400° C. The results are shown in FIG. 1.

The TPR profiles for the ruthenium catalyst and Example 1 to 3 show peaks between 50 and 90° C. demonstrating that the ruthenium is present in a form that is readily reducible under fuel cell operating temperatures. The TPR profile for Comparative Example 3 shows no peaks between 25° C. and 150° C. and therefore is not reducible to the metallic form of ruthenium at fuel cell operating temperatures.

Ex-situ Example Evaluation

The gas phase selective oxidation layers of Comparative Examples 1 to 3 and Examples 1 to 3 were tested for the removal of CO from a H$_2$ rich gas stream with the addition of an air bleed, in an experimental set-up which was similar to that of a fuel cell. This is termed ex-situ evaluation. The selective oxidation layers were fabricated into small (6.45 cm$^2$) MEAs using a bare piece of Toray TGP90 as a 'cathode' and either a piece of Nafion 115 or a piece of 0.1 mm thick photocopier transparency film, as the membrane. The MEAs were tested in a small fuel cell, with the selective oxidation electrode run as the anode. A humidified fuel stream of 100 ppm CO in H$_2$ was used at a gas flow of 0.2 SLM at a pressure of 30 psi. Humidified N$_2$ at similar flow rates and pressures was used as a 'cathode' stream. The effectiveness of the selective oxidation electrode was assessed by introducing different levels of air bleed into the fuel stream and monitoring the CO level in the output gas stream using a Signal 2000 low flow CO analyser. No electrical load was applied to the electrodes, but the test set up otherwise mimicked the conditions of temperature, humidity and flow rates present within a fuel cell. The results are given in Table 2.

TABLE 2

| | CO level after 30 minutes at steady state | | |
|---|---|---|---|
| Example | 1% Air bleed | 2% Air Bleed | 5% Air Bleed |
| Comparative Example 1 | 83 | 74 | 4 |
| Comparative Example 2 | 75 | 12 | 4 |
| Comparative Example 3 | 100 | 100 | 96 |
| Example 1 | 20 | 14 | 10 |
| Example 2 | 40 | 6 | 6 |
| Example 3 | 50 | 15 | 9 |

It can be seen from Table 2 that the Examples 1–3 clearly demonstrate a much greater ability than the examples of state of the art platinum catalysts for reducing the levels of carbon monoxide with low levels of air bleed Furthermore, the ruthenium catalyst used in Comparative Example 3 has clearly been rendered inactive during the electrode formation. This result can be further explained by considering the XRD and TEM measurements.

XRD and TEM Measurements

XRD and TEM measurements were carried out on the ruthenium catalyst, Comparative Example 3 and Examples 1 to 3. The results are shown in Table 3.

TABLE 3

| | XRD | | TEM | |
|---|---|---|---|---|
| Sample | Main phase | Crystallite size (nm) | Main phase | Particle size |
| Ruthenium Catalyst | Ru | 3.6 [1] | | |
| Comparative Example 3 | RuO$_2$ tetragonal | — | RuO$_2$ needles | 10–50 nm |
| Example 1 | RuO$_2$ and Ru | — | | |
| Example 2 | — | — | Ru | 5 nm particles clustering to 100 nm |
| Example 3 | — | — | Ru | 5 nm particles clustering to 100 nm |

[1] The ruthenium catalyst was reduced in flowing 10% H$_2$/N$_2$ at 150° C. for 2 hours prior to the XRD measurement.

As can be seen from Table 3, the active electrodes are those in which the ruthenium is at least partially present in the metallic form. The ruthenium in Comparative Example 3 which shows no activity is present in the crystalline state as RuO$_2$ needles. Example 1 shows a mixture of Ru/RuO$_2$ which suggests that it is not necessary for all of the Ruthenium to be in a reducible state.

Fuel Cell Testing

Fuel cell anodes were prepared as described in EP 0 736 921 comprising a selective oxidation layer and an electrocatalyst layer. The electrocatalyst layer consisted of a PtRu alloy catalyst at nominal loading of 40% Pt and 20% Ru supported on Cabot Vulcan XC-72R applied to the substrate in the form of a Nafion ink. Two anodes comprising a ruthenium catalyst selective oxidation layer were prepared. The ruthenium catalyst inks were as used in examples 1 and 2. Two other anodes were prepared for comparison purposes (i) with no catalyst in the selective oxidation layer and (ii)

with a platinum catalyst in the selective oxidation layer (the platinum catalyst ink was as used in comparative example 2). The anode samples are described in Table 4:

TABLE 4

| | Selective Oxidation Layer |
|---|---|
| Anode 1 | Ruthenium catalyst as used in example 1 (0.3 mg/cm$^2$ Ru, 18% PTFE). |
| Anode 2 | Ruthenium catalyst as used in example 2 (0.3 mg/cm$^2$ Ru, 12% FEP). |
| Comparative Anode 1 | No catalyst. Shawinigan carbon/PTFE layer. |
| Comparative Anode 2 | Platinum catalyst as used in comparative example 2 (0.3 mg/cm$^2$ Pt, 18% PTFE). |

Figure 2:
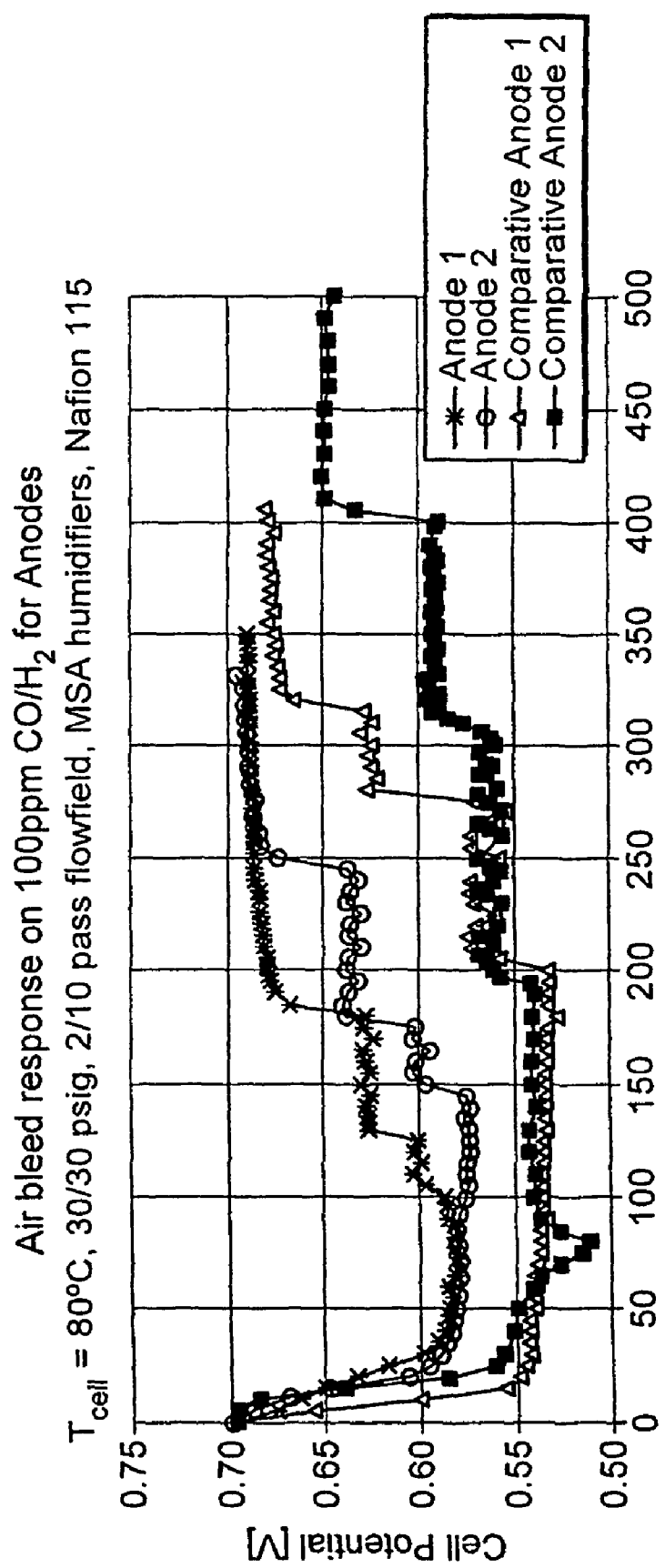

The different anode samples described above were made into membrane electrodes assemblies (MEAs) using Nafion 115 membranes and conventional cathodes with nominal Pt loadings of 0.75 mgPt/cm$^2$. The MEA was prepared by hot pressing the membrane between the anode and cathode. Testing was carried out in Ballard Mk V hardware at 30 psig and 80° C. using Nafion 117 internal humidifiers and $H_2:O_2$ stoichiometries of 1.5:2. Samples were then conditioned in single cells for 2 days and the performance on a synthetic reformate mixture of the composition 100 ppm CO/$H_2$ was recorded. FIG. 2 shows a graph of the performance of the different MEAs. Initially the performance on pure hydrogen and air (at the cathode) is recorded. After several minutes the anode gas stream is switched to 100 ppm CO in hydrogen, which causes degradation in cell voltage. For each sample different levels of air bleed, 1, 2 and 5% are applied and the performance allowed to stabilise at each level.

FIG. 2 clearly shows the CO oxidation layer in the MEAs prepared from the anodes 1 and 2 show equal or better performance that a PtRu layer alone or a PtRu+Pt layer. Two other beneficial features of a ruthenium based material are also illustrated by this graph. Firstly the slower decline in MEA performance in the presence of the ruthenium layer when transferring from hydrogen to a poisoning mixture would suggest that the reduced ruthenium can absorb more than one carbon monoxide molecule. This property of the catalyst layer would reduce the impact on MEA performance of carbon monoxide spikes generated by a reformer unit. Secondly, both the MEAs using anode structures of the invention show a greater intrinsic tolerance to 100 ppm CO level before the application of the air bleed. This may indicate a CO clean up reaction occurring within the ruthenium catalyst layer in the absence of air bleed, possibly water gas shift or methanation.

Durability Testing

A durability study was carried out on three different MEAs consisting of 1000 hours of testing, using real reformate generated by a Methanol Hot Spot reformer and Demonox unit as anode fuel. The MEAs comprised anodes corresponding to anode 2, comparative anode 1 and comparative anode 2, as described above. Typically the anode reformate fuel used during contained 52% $H_2$, 27% $N_2$, 21% $CO_2$ and 40 ppm CO and a 2% air bleed was applied throughout the durability study. Diagnostic tests were carried out at the start of life and after 500 and 1000 hours to investigate durability and the effect of long term use of air bleed on MEA performance.

Table 5 shows performance losses for the three MEA using a 40 ppmCO/25% $CO_2/H_2$ fuel mix on the anode and the effect of addition of different levels of air bleed. This anode poisoning test was carried out at different stages of the durability study to assess deterioration of the samples

TABLE 5

| MEA | Performance loss in mV, 40 ppm CO/25% $CO_2/H_2$ anode gas stream | | | |
|---|---|---|---|---|
| | 0% air bleed | 1% air bleed | 2% air bleed | 5% air bleed |
| MEA comprising Comparative Anode 1 | | | | |
| Start | 111 | 47 | 20 | 17 |
| 500 hrs | 118 | 67 | 42 | 24 |
| MEA comprising Comparative Anode 2 | | | | |
| Start | 110 | 64 | 22 | 16 |
| 500 hrs | 134 | 35 | 22 | 20 |
| 1000 hrs | 129 | 42 | 21 | 19 |
| MEA Comprising Anode 2 | | | | |
| Start | 113 | 27 | 13 | 12 |
| 500 hrs | 115 | 19 | 13 | 11 |
| 1000 hrs | 122 | 23 | 10 | 8 |

The performance losses with 1–5% air bleed for the MEA comprising Anode 2 are seller than those comprising Comparative Anodes 1 and 2, indicating the use of a ruthenium catalyst in a selective oxidation layer can enhance air bleed response.

Furthermore, the good performance of the MEA comprising Anode 2 is maintained after 1000 hours on reformate and air bleed indicating the durability of the layer.

At all stages of testing the MEA comprising Anode 2 requires less air bleed for the same level of recovery, indicating the Ru catalyst is more active than the Pt/PtRu anode and PtRu anode examples.

The invention claimed is:

1. An anode structure comprising a proton exchange membrane, an electrocatalyst layer thereon, and a layer comprising a ruthenium catalyst on a surface of the electrocatalyst layer opposite the proton exchange membrane or separated from the electrocatalyst layer by an interspersed gas diffusion substrate, or a combination of these;
    wherein said ruthenium catalyst consists essentially of ruthenium deposited on a conducting support wherein the ruthenium is at least partially present in metallic form or in a form that is readily reducible to the metallic form at temperatures of 25° C. to 150° C., and
    wherein the ruthenium catalyst and the electrocatalyst are arranged such that a reactant gas stream will first contact the ruthenium catalyst and thereafter contact the electrocatalyst.

2. The anode structure according to claim 1, wherein the ruthenium catalyst is a gas phase catalyst.

3. The anode structure according to claim 1, wherein the layer comprising the ruthenium catalyst also comprises a gas diffusion substrate in which the ruthenium catalyst is embedded, or wherein the anode structure comprises a gas diffusion substrate on a surface of the layer comprising the ruthenium catalyst opposite the electrocatalyst layer, or a combination of these.

4. A process for the preparation of an anode structure according to claim 3, said process comprising a step of applying the ruthenium catalyst to the gas diffusion substrate.

5. The process according to claim 4, wherein said process comprises the further step of firing said anode structure.

6. The process according to claim 5, wherein said firing process is carried out at a temperature below 375° C.

7. The process according to claim 6, wherein said firing process is carried out at a temperature below 275° C.

8. The process according to claim 5, wherein said firing process is carried out in an environment devoid of oxygen.

9. The process according to claim 8, wherein said firing process is carried out in nitrogen.

10. A process for the preparation of an anode structure according to claim 3, said process comprising the steps of applying the ruthenium catalyst and the electrocatalyst to the gas diffusion substrate.

11. The anode structure according to claim 3, wherein the layer comprising the ruthenium catalyst is on the surface of the electrocatalyst layer and also comprises said gas diffusion substrate In which the ruthenium catalyst is embedded.

12. The anode structure according to claim 3, wherein the layer comprising the ruthenium catalyst is on the surface of the electrocatalyst layer, and wherein the anode structure further comprises said gas diffusion substrate on said surface of the layer comprising the ruthenium catalyst that is opposite the electrocatalyst layer.

13. The anode structure according to claim 3, wherein the layer comprising the ruthenium catalyst is separated from said electrocatalyst layer by said interspersed gas diffusion substrate.

14. The anode structure according to claim 1, wherein said anode structure prevents poisoning of the electrocatalyst.

15. A process for the preparation of an anode structure according to claim 1, said process comprising the steps of applying the ruthenium catalyst and the electrocatalyst to the membrane.

16. A membrane electrode assembly comprising an anode structure according to claim 1.

17. A fuel cell comprising a membrane electrode assembly according to claim 16.

* * * * *